No. 623,128. Patented Apr. 18, 1899.
F. D. BARTLETT.
SELF CLOSING HOSE NOZZLE.
(Application filed Apr. 28, 1898.)
(No Model.)
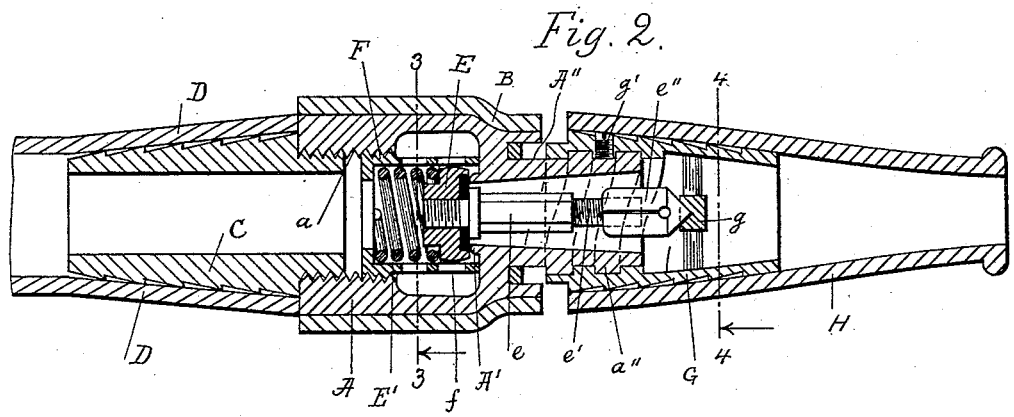
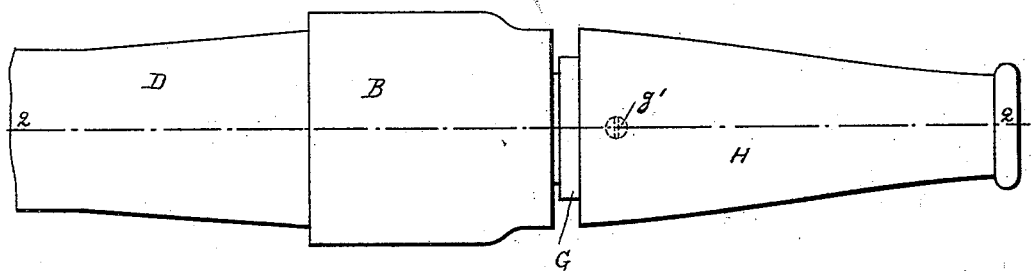
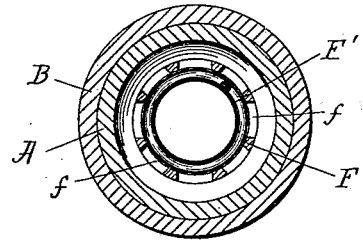
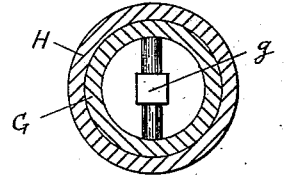
Witnesses.
Karl A. Andrén.
Samuel J. Craddock.
Inventor.
Frank D. Bartlett.
by Alban Andrén his atty.

UNITED STATES PATENT OFFICE.

FRANK D. BARTLETT, OF SOMERVILLE, MASSACHUSETTS.

SELF-CLOSING HOSE-NOZZLE.

SPECIFICATION forming part of Letters Patent No. 623,128, dated April 18, 1899.

Application filed April 28, 1898. Serial No. 679,053. (No model.)

*To all whom it may concern:*

Be it known that I, FRANK D. BARTLETT, a citizen of the United States, residing at East Somerville, in the county of Middlesex and State of Massachusetts, have invented new and useful Improvements in Self-Closing Hose-Nozzles, of which the following is a specification.

This invention relates to improvements in self-closing hose-nozzles; and it has for its object to automatically close the flow of the water as soon as the operator releases his hold on the ejector portion of the nozzle, as will hereinafter be more fully shown and described, reference being had to the accompanying drawings, wherein—

Figure 1 represents a side elevation of the invention. Fig. 2 represents a central longitudinal section on the line 2 2 shown in Fig.
1. Fig. 3 represents a cross-section on the line 3 3 shown in Fig. 2, and Fig. 4 represents a cross-section on the line 4 4 shown in Fig. 2.

Similar letters refer to similar parts where-ever they occur on the different parts of the drawings.

In the drawings, A represents the valve-shell, which is preferably covered on its outside with a rubber or elastic shield B, so as to prevent the chipping of porcelain-lined tanks, such as are used in breweries, in case the nozzle should be thrown carelessly against the sides or bottom of such tanks.

The valve-shell A is provided with an internal screw-thread $a$, adapted to receive the screw-threaded portion of the hose-coupling C, to which the hose D is attached in any well-known manner, as shown.

Within the valve-shell A is an annular valve-seat A', against which is normally seated the valve E, as shown in Fig. 2. Said valve is yieldingly held against its seat by the influence of a coiled spring E', the outer end of which rests against a sleeve F, which is open from end to end and preferably provided with side perforations $f$ $f$, as shown. The sleeve F is screw-threaded at its outer end and screwed into the female screw-thread $a$ on the interior of the valve-shell A, as shown.
The pressure of the water within the valve-shell A also serves to normally hold the valve E against its seat A'.

In one piece with the valve-shell A is made a tubular extension A'', provided on its exterior with a quick screw-thread $a''$, adapted to receive the correspondingly internally-screw-threaded nozzle or ejector-tube G, surrounded by the rubber nozzle H, as shown.

By covering the metal tube G with the rubber nozzle H the said metallic tube G is prevented from coming in contact with the porcelain-lined tanks used in breweries in case said tube should be thrown against the bottom or sides of said tank.

Within the tube G is a cross-bar $g$, as shown in Figs. 2 and 4. Attached to or made integral with the valve E is a shank $e$, provided with a screw-threaded extension $e'$, onto which is screwed the internally-screw-threaded adjustable valve stop or head $e''$, the outer end of which is adapted to rest against the cross-bar $g$ in the ejector-tube G by the influence of the spring E', as shown in Fig. 2. By this arrangement it will be seen that the valve E is normally held closed against its seat A' by the influence of the spring E' and pressure of the water, and during the closing movement of said valve its adjustable head $e''$ is held in contact with the cross-bar $g$ in the ejector-shell G, causing the latter to be turned around its axis and moved in a longitudinal direction away from the valve-seat A', as represented in Fig. 2.

By adjusting the position of the head $e''$ on the valve-spindle the amount of opening of the valve is regulated.

In using the device it is only necessary to grasp the rubber nozzle H and turn it and the ejector-tube G slightly around its axis, causing the valve E to be forced away from its seat by the cross-bar $g$ acting on the end of the head $e''$ of the said valve, thus allowing the water under pressure from the hose-pipe D to pass freely by the said valve E and out through the nozzle H. As soon as the operator lets go his hold on the rubber nozzle H the spring E' causes the valve E to be forced against its seat A', thus closing the supply of water to the nozzle H and at the same time causing the nozzle-tube or ejector-shell G to be spirally forced outward by the action of the spindle-head $e''$ against the cross-bar $g$ on the interior of the shell G, thus holding the valve closed as long as the operator releases his hold on the nozzle H, and by this arrangement automatically stopping the flow of water, by which unnecessary waste of water is prevented.

The device is very simple in construction, composed of very few parts, and by the construction as shown and described the water can easily be turned on through the nozzle simply by turning the latter slightly around its axis and causing the water to be automatically shut off as soon as the operator lets go his hold on the nozzle, as hereinbefore set forth and described.

What I wish to secure by Letters Patent and claim is—

The herein-described self-closing nozzle, consisting in combination, a valve-shell having a valve-seat, a spring-pressed valve, a screw-threaded valve-shell extension, an internally-screw-threaded ejector-tube, and elastic coverings on said valve-shell and ejector-tube, substantially as and for the purpose set forth.

In testimony whereof I have hereunto set my hand in presence of two subscribing witnesses.

FRANK D. BARTLETT.

Witnesses:
ALBAN ANDRÉN,
KARL A. ANDRÉN.